Patented Mar. 3, 1942

2,275,034

UNITED STATES PATENT OFFICE 2,275,034

ESTERS OF 4-CYCLOHEXENE-1,2-DICARBOXYLIC ACID

Clarence L. Moyle, Midland, Mich., assignor to The Dow Chemical Company, Midland, Mich., a corporation of Michigan No Drawing. Application May 2, 1941, Serial No. 391,481

12 Claims. (Cl. 260—468)

This invention concerns new esters of 4-cyclohexene-1,2-dicarboxylic acid and certain allyl-type alcohols, i. e. alcohols of the general formula:

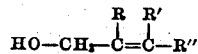

wherein R represents a simple neutral substituent of the group consisting of the methyl radical, hydrogen, and halogen, R' represents a member of the group consisting of the methyl radical and hydrogen, and R" represents a member of the group consisting of hydrocarbon radicals and hydrogen.

The esters provided by the invention vary from crystalline solids to colorless to yellow, high boiling, mobile or somewhat viscous liquids. They have insecticidal properties and can also be used as plasticizers, as light stabilizers for vinylidene chloride resins, and as co-polymerizing agents with styrene.

The new esters are prepared by reacting 4-cyclohexene-1,2-dicarboxylic acid with the allyl-type alcohols, such as allyl alcohol, geraniol, cinnamyl alcohol, etc. The mono-esters are prepared preferably by using approximately equimolar proportions of the acid and alcohol. The di-esters are prepared preferably with an excess of alcohol and in the presence of a small amount of an acid catalyst such as benzene sulfonic acid. A wide range of temperatures may be used, but it is preferred to carry out the reaction at a temperature below about 135° C. in order to avoid possible decomposition of the products. Water formed during the reaction is removed as an azeotrope, distilling together with a portion of the alcohol. The oily residue is washed with an aqueous alkali and distilled under reduced pressure. Although the method described is preferred, any suitable esterification method may be used, provided that care is taken to prevent decomposition or polymerization of the ester product.

The following examples illustrate a number of ways in which the principle of the invention may be employed, but are not to be construed as limiting the invention.

Example 1

93 grams (0.6 mole) of 4-cyclohexene-1,2-dicarboxylic acid anhydride and 209 grams (3.6 moles) of allyl alcohol were reacted in the presence of 1 gram of benzene sulfonic acid as catalyst. Water was distilled from the reaction mixture as an azeotrope with the excess allyl alcohol. The oily residue remaining after the distillation was washed with an aqueous sodium bicarbonate solution, dried, and distilled. The ester, diallyl 4-cyclohexene-1,2-dicarboxylate, distilled as a colorless liquid. It has a boiling point of 150°–152° C. at 8 millimeters pressure, a specific gravity at 25°/25° of 1.09, a refractive index at 25° of 1.4840, and the formula:

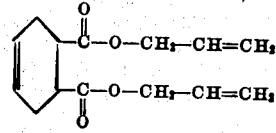

Example 2

45.6 grams (0.3 mole) of 4-cyclohexene-1,2-dicarboxylic acid anhydride and 129.7 grams (1.8 moles) of 2-methylallyl alcohol were reacted at a temperature of 115°–135° C. in the presence of 0.8 gram of phenol sulfonic acid as catalyst. The product was the di-2-methylallyl ester of 4-cyclohexene-1,2-dicarboxylic acid. It has the formula:

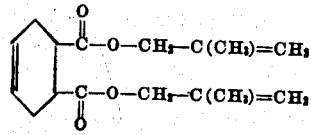

This ester is a colorless mobile liquid having a boiling point of 150°–160° C. at 4.5 millimeters pressure, a specific gravity at 25°/25° of 1.03, and a refractive index at 25° of 1.4693.

Example 3

45.6 grams (0.3 mole) of 4-cyclohexene-1,2-dicarboxylic acid anhydride and 277.2 grams (1.8 moles) of geraniol were reacted at a temperature of 82°–100° C. in the presence of 0.8 gram of phenol sulfonic acid under 49 millimeters pressure. The ester product formed was the di-geraniol ester of 4-cyclohexene-1,2-dicarboxylic acid. It has the formula:

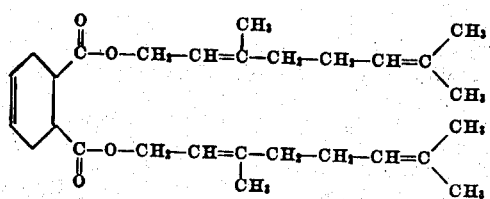

This ester is a yellow slightly viscous oil having a boiling point of 234°–244° C. at 3.5 millimeters pressure, a specific gravity at 25°/20° of 0.94, and a refractive index at 25° of 1.4902.

*Example 4*

93 grams (0.6 mole) of 4-cyclohexene-1,2-dicarboxylic acid anhydride and 336 grams (3.6 moles) of 2-chloroallyl alcohol were reacted at a temperature of 115°–135° C. in the presence of 1 gram of benzene sulfonic acid at 150 millimeters pressure. The product was the di-(2-chloroallyl) ester of 4-cyclohexene-1,2-dicarboxylic acid. It has the formula:

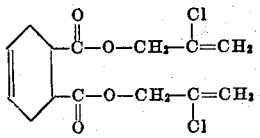

This ester is a pale yellow mobile liquid having a boiling point of 185°–190° C. at 18 millimeters pressure, a specific gravity at 25°/25° of 1.24, and a refractive index at 25° of 1.5039.

*Example 5*

A mixture of 152 grams (1 mole) of 4-cyclohexene-1,2-dicarboxylic acid anhydride and 58 grams (1 mole) of allyl alcohol was heated for 6 hours under reflux on a steam bath. The product was then concentrated on a hot plate until the temperature of the residue reached 108° C. The ester product was the mono-allyl ester of 4-cyclohexene-1,2-dicarboxylic acid. It has the formula:

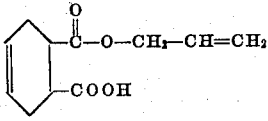

This ester is a viscous pale orange colored oil which slowly crystallizes on standing. It has a refractive index at 25° C. of 1.4971.

*Example 6*

A mixture of 38 grams (0.25 mole) of 4-cyclohexene-1,2-dicarboxylic acid anhydride and 34 grams (0.25 mole) of cinnamyl alcohol was heated for six hours under reflux on a steam bath. Upon cooling, a viscous liquid remained. The latter was dissolved in 250 c. c. of 2N sodium hydroxide and the solution was extracted with ethylene dichloride to remove di-esters and any unreacted alcohol. The aqueous solution was acidified with dilute hydrochloric acid and the product was extracted from the mixture with ethylene dichloride. The ester product, which was obtained by evaporation of the solvent, was the mono-cinnamyl ester of 4-cyclohexene-1,2-dicarboxylic acid. It has the formula:

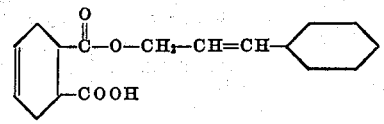

This ester is a pale yellow viscous oil which crystallizes on standing. The crystals have a melting point of 87°–88° C.

Other esters of the present invention are mono- and di-2-bromoallyl 4-cyclohexene-1,2-dicarboxylate, mono- and dicrotyl 4-cyclohexene-1,2-dicarboxylate, mono-chloroallyl 4-cyclohexene-1,2-dicarboxylate, etc.

I claim:

1. An ester of 4-cyclohexene-1,2-dicarboxylic acid and an alcohol of the general formula:

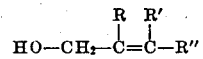

wherein R represents a simple neutral substituent of the group consisting of the methyl radical, hydrogen, and halogen; R' represents a member of the group consisting of the methyl radical and hydrogen; and R" represents a member of the group consisting of hydrocarbon radicals and hydrogen.

2. An ester of 4-cyclohexene-1,2-dicarboxylic acid and an alcohol of the general formula:

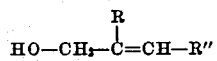

wherein R represents a simple neutral substituent of the group consisting of the methyl radical, hydrogen, and halogen; and R" represents a member of the group consisting of hydrocarbon radicals and hydrogen.

3. An ester of 4-cyclohexene-1,2-dicarboxylic acid and an alcohol of the general formula:

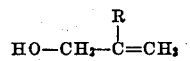

wherein R represents a simple neutral substituent of the group consisting of the methyl radical, hydrogen, and halogen.

4. An ester of 4-cyclohexene-1,2-dicarboxylic acid having the general formula:

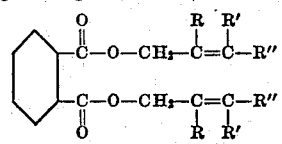

wherein R represents a simple neutral substituent of the group consisting of the methyl radical, hydrogen, and halogen; R' represents a member of the group consisting of the methyl radical and hydrogen; and R" represents a member of the group consisting of hydrocarbon radicals and hydrogen.

5. An ester of 4-cyclohexene-1,2-dicarboxylic acid having the general formula:

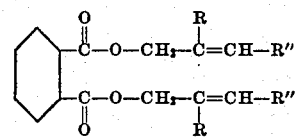

wherein R represents a simple neutral substituent of the group consisting of the methyl radical, hydrogen, and halogen and R" represents a member of the group consisting of hydrocarbon radicals and hydrogen.

6. An ester of 4-cyclohexene-1,2-dicarboxylic acid having the general formula:

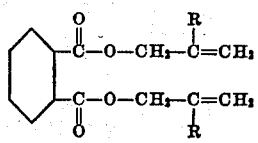

wherein R represents a simple neutral substituent of the group consisting of the methyl radical, hydrogen, and halogen.

7. An ester of 4-cyclohexene-1,2-dicarboxylic acid having the general formula:

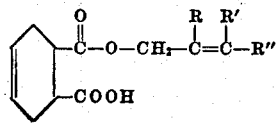

wherein R represents a simple neutral substituent of the group consisting of the methyl radical, hydrogen, and halogen; R' represents a member of the group consisting of the methyl radical and hydrogen; and R" represents a member of the group consisting of hydrocarbon radicals and hydrogen.

8. An ester of 4-cyclohexene-1,2-dicarboxylic acid having the general formula:

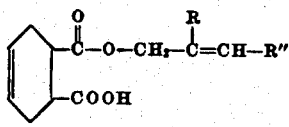

wherein R represents a simple neutral substituent of the group consisting of the methyl radical, hydrogen, and halogen; and R" represents a member of the group consisting of hydrocarbon radicals and hydrogen.

9. An ester of 4-cyclohexene-1,2-dicarboxylic acid having the general formula:

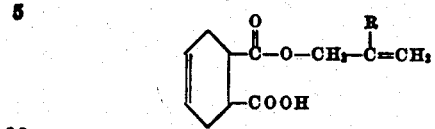

wherein R represents a simple neutral substituent of the group consisting of the methyl radical, hydrogen, and halogen.

10. Di-(2-methylallyl) 4-cyclohexene-1,2-dicarboxylate.

11. Diallyl 4-cyclohexene-1,2-dicarboxylate.

12. Mono-allyl 4-cyclohexene-1,2-dicarboxylate.

CLARENCE L. MOYLE.